United States Patent [19]

Pinder et al.

[11] Patent Number: 5,758,267
[45] Date of Patent: May 26, 1998

[54] METHOD AND APPARATUS FOR ORIENTATION CONTROLLED PARAMETER SELECTION

[75] Inventors: Ellis A. Pinder, Davie; Charles P. Schultz, Hialeah, both of Fla.

[73] Assignee: Motorola, Inc., Schaumburg, Ill.

[21] Appl. No.: 676,610

[22] Filed: Jul. 8, 1996

[51] Int. Cl.⁶ .................................................. H04B 1/38
[52] U.S. Cl. .................. 455/90; 455/550; 455/575; 341/22; 341/20
[58] Field of Search ........................ 455/550, 575, 455/90, 73

[56] References Cited

U.S. PATENT DOCUMENTS

| | | | |
|---|---|---|---|
| 4,817,194 | 3/1989 | Andros, Jr. | 455/154 |
| 5,006,676 | 4/1991 | Bogut et al. | 200/61.52 |
| 5,175,759 | 12/1992 | Metrka et al. | 455/90 |
| 5,239,691 | 8/1993 | Retzer et al. | 455/89 |
| 5,349,360 | 9/1994 | Matsui | 342/374 |
| 5,432,510 | 7/1995 | Matthews | 341/20 |
| 5,544,130 | 8/1996 | Mizuno et al. | 369/1 |
| 5,627,531 | 5/1997 | Posso et al. | 341/22 |
| 5,640,689 | 6/1997 | Rossi | 455/90 |
| 5,715,311 | 8/1994 | Sudo et al. | 379/428 |

*Primary Examiner*—David R. Hudspeth
*Assistant Examiner*—Daniel Abebe
*Attorney, Agent, or Firm*—Dale W. Dorinski

[57] ABSTRACT

An orientation controlled method of switching the operational mode of an electronic device adds additional functionality to existing buttons or switches. The electronic device (10) typically contains an orientation detector (30) which is sensitive to its position in space. One or more of these orientation detectors is linked to appropriate sections of the electronic device and act to switch between the various operational modes of the device. When the user orients the device to a predetermined position in space, the orientation detectors are activated or engaged, thus sending a signal to the device to change the operational mode. The user then has the option of pushing a button (22, 24) to select that particular operational mode or to toggle between various submodes of that operational mode. When the user input is complete and the device is returned to the original orientation, the orientation detectors are deactivated or disengaged and the device is then used in a normal operating fashion.

23 Claims, 4 Drawing Sheets

5,758,267

METHOD AND APPARATUS FOR ORIENTATION CONTROLLED PARAMETER SELECTION

TECHNICAL FIELD

This invention relates in general to switching mechanisms and, more specifically, to a switching scheme that utilizes the orientation of an electronic device to switch the operation of the device.

BACKGROUND

As electronic devices continue to shrink in size, ergonomic design constraints become more important and pose greater challenges. For example, a palm-size communication device, such as a two-way radio or a pager that contains a speaker, a display, and a numeric keypad, has minimal space for other user controlled and feature activation buttons. This constraint of small size is forcing manufacturers to limit the number of features that are available on electronic devices, because there is not enough surface area on the exterior of the device to provide the necessary switches and buttons. In some two-way radios, for example, the user must choose a single subset of features from amongst many available, leaving other features or functions inaccessible to the user.

Prior art devices that have faced this problem, such as wristwatches, have attempted to overcome this limitation by providing multiple functionalities to each of the buttons or switches. For example, a single button on a wristwatch can be used to move the time ahead by depressing once, move the time backward by depressing twice, or move the display rapidly by holding the button "in" continuously. Further, selection of two or even three buttons simultaneously will access other seldom used features of the wristwatch. However, this solution, while elegant, is difficult for the casual user to remember. The selection of multiple switches simultaneously or depressing switches for various periods of time is not intuitive and leads to confusion.

It would be highly desirable if a method could be found that would enhance the functionality of switches or buttons without adding additional buttons and without creating a scheme that is not intuitive to the user. Such a method would decrease the confusion of the operator and make operation of the electronic device simpler and straight forward.

DETAILED DESCRIPTION OF THE PREFERRED EMBODIMENT

Figure 1:
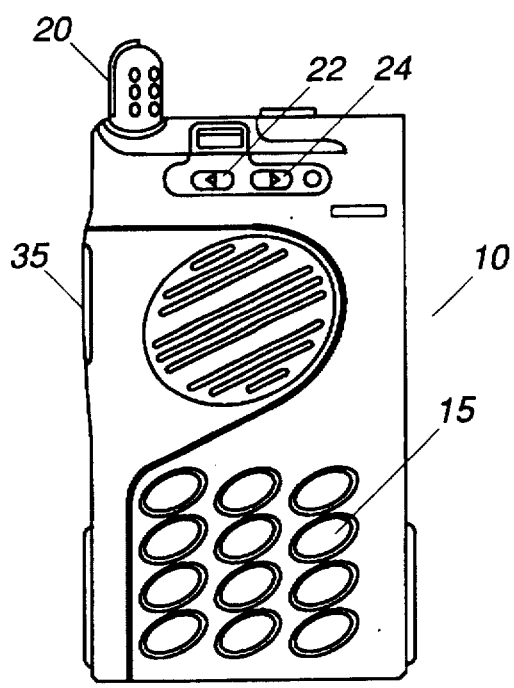
FIG. 1 is a portable two way radio.

An orientation controlled method of switching the operational mode of an electronic device adds additional functionality to existing buttons or switches. The electronic device typically contains an orientation detector which is sensitive to its position in space. One or more of these orientation detectors is linked to appropriate sections of the electronic device and act as a switch to switch between the various operational modes of the device. When the user orients the device to a predetermined position in space, the orientation detectors are activated or engaged, thus sending a signal to the device to change the operational mode. The user then has the option of pushing a button to select that particular operational mode or to toggle between various submodes of that operational mode. When the user input is complete and the device is returned to the original orientation, the orientation detectors are deactivated or disengaged and the device is then used in a normal operating fashion.

While the specification concludes with claims defining the features of the invention that are regarded as novel, it is believed that the invention will be better understood from a consideration of the following description in conjunction with the drawing figures, in which like reference numerals are carried forward.

While the instant invention can be used in many types of electronic devices, the preferred embodiment herein is for use in a portable radio; however it is not intended that the scope of the invention be limited strictly to a portable radio and the reader will appreciate that the invention disclosed herein will find application in many other types of electronic devices.

The electronic package of the present invention is utilized in a radio comprising any well-known radio, such as portable two-way radios manufactured by Motorola Inc., which may operate in either receive or transmit modes. The radio 10 includes a receiver section and a transmitter section which comprise means for communicating, that is, transmitting or receiving communication signals for the radio.

In the receive mode, the portable radio receives a communication signal via an antenna. A transmit/receive (T/R) switch couples the received communication signal to the receiver. The receiver receives and demodulates the received communications signal and presents its audio component to a speaker. It may be appreciated by one of ordinary skill in the art that other functions not herein described may be provided by any suitable means, including a controller means, which controls the entire operation of the radio.

In the transmit mode, audio messages are coupled from a microphone where they are used to modulate a carrier signal as is well known in the art. The modulated carrier signal is then applied to the antenna through the T/R switch for transmission of the communication signal. It may be appreciated that the electronic package, according to the principals of the present invention, may be utilized in suitable sections of the transmitter or receiver sections, respectively.

Referring now to FIG. 1, a typical two-way radio 10 contains a numeric keypad 15, an on-off volume switch, and two additional selection buttons or switches 22 and 24. The radio 10 may optionally also contain a display either on the front or the top of the radio which will serve to provide feedback to the user as to which of the features is selected. In addition to these features, the radio typically contains a receiver, an antenna, and a controller, and may optionally contain a transmitter. The radio also contains an orientation detection means 30 (not shown in FIG. 1) that is typically disposed inside the housing of the radio. The orientation detection means, also known as a tilt detector or orientation detector, can be any number of orientation sensitive switches, such as mercury switches typically found in home thermostats, or absolute angular sensors often found in avionics equipment. Other types of orientation detectors might be adapted, such as encoders used in track balls or the well-known "mouse" pointing device used with personal computers. Each of these orientation devices is constructed so as to activate or engage when the radio is tilted or adjusted to a particular position or orientation in space.

A first embodiment of the invention finds that the tilting of the radio serves to provide an additional ergonomic input. This input is useful for making selections or scrolling lists in conjunction with the buttons 22 and 24. When using buttons 22 and 24 to make a selection from a list of features or entries, tilting the radio 10 to a first position, for example, 30° from vertical, performs the function of scrolling up or down through a list of choices for that particular feature or operational mode. Tilting the radio to this position results in a single increment of the items in the list. In order to increment again, the radio would be returned to the initial position and tilted back to the 30° position. A second optional predetermined angle, for example, 60° or 90°, would result in continuous scrolling of the list of items. An example of how this feature works is that case of placing a phone call from a list of numbers resident in the memory of the radio. The user first selects the phone feature of the radio in a conventional manner by pushing one or more of the buttons on the keypad, the radio is then tilted to a first position between approximately 60° and 90° from vertical and held in that position to rapidly travel through the long phone list. As the user approaches that portion of the phone list where the desired name appears, the radio is then tilted from that position back towards vertical to an angle of approximately 30° to stop the rapid scrolling and to increment the various phone numbers one at a time. Once the desired number appears, the user would provide a second input by hitting a switch, such as a push-to-talk switch (PTT) 35 or one of the buttons 22, 24. This switching activity or actuation would serve to select that particular phone number and allow the user to then initiate the phone call in a normal manner. This embodiment may also be used to select zones, channels, private call identifications, status, messages, and so forth in a similar fashion.

An alternate embodiment uses the converse of this method to select the phone number. The combination of the orientation detection means being activated in the buttons or switches allows a user to select from a list of features, for example, phone numbers, channel selection, zone selection, and so forth. In this embodiment, the buttons or switches are used first to select the features and once inside that feature, the tilting mechanism is used to activate the orientation detector to select an item from the list in that feature. This is in contrast with the previous embodiment where the tilting was used to select the feature and the button was then used to select an item from that feature. That is, this embodiment uses the button to select the feature and the tilting mechanism to select the item in the list.

Another embodiment of the invention redefines the function of the buttons when the radio is in a tilted or skewed orientation. In the prior art, buttons or switches had a single functionality and in order to add a second functionality to the buttons, there had to be additional buttons or switches used to activate that feature. For example, in calculators one button has two or more functions, but in order to engage the alternate functions, one has to press and hold the shift key while engaging the button. In this embodiment of the invention, the tilting mechanism which activates the orientation detector is used to redefine the function of the buttons. In other words, the orientation detector serves as a substitute for the step of holding down the shift key when using a calculator to select an alternate function of a button. By tilting the radio to a predetermined position in space, the orientation detector is activated and sends a signal to the controller in the radio to switch the operational mode of the radio from a first mode to a second mode. For example, tilting the radio changes the zone of the radio from zone 1 to zone 2. Once in zone 2, the buttons 22 and 24 may be used to scroll up and down through the zone to select a channel through the zone to select a channel from within that zone. It is to be understood that a radio may have more than two zones, for example, many radios today contain six to ten zones, each zone containing ten or more separate channels to create upwards of one hundred channels per radio. By tilting the radio to a predetermine position, say 90° from horizontal, the orientation detection means is activated, causing the radio to change from the first zone to the second zone. Once inside the second zone, the operator then scrolls through that zone to select the appropriate channel. Another example finds the code plug in the radio programmed to define the buttons 22 and 24 to designate channel up/channel down selection when the radio is in the vertical position, and to select the zone when the radio is in the horizontal position. Similarly, a side button could initiate a private call while in the vertical position, or a call alert in the horizontal position. One implementation of this invention is in a pocket-sized radio containing an alphanumeric display. Changes in the orientation of the display also accompany changes in the orientation of the radio and the functionality assigned to the various switches or push buttons. When appropriate, tilting to change the parameter selection also produces an audio feedback such as a tone or a beep in addition to or in place of the visual feedback experienced on the display. Another use for this scheme is to set the volume of the radio without using a traditional volume control. In this case, the volume switch 20 is replaced and the volume is set simply by tilting the radio the required number or times to increment the volume up or down to a certain position.

Figure 2:
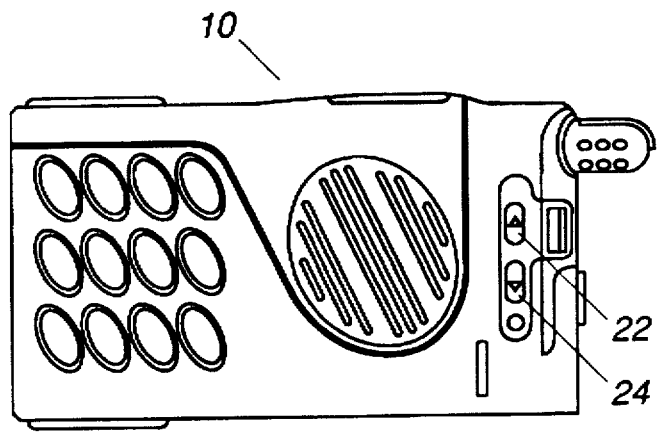
FIG. 2 is the portable two way radio of FIG. 1 rotated 90° clockwise in accordance with the invention.
Figure 3:
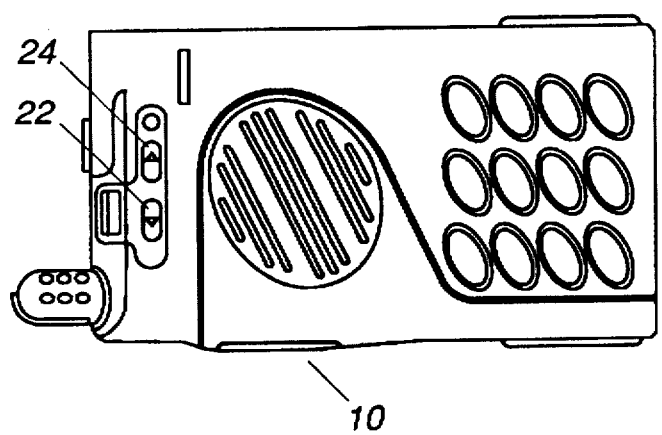
FIG. 3 is the portable two way radio of FIG. 1 rotated 90° counterclockwise in accordance with the invention.

Referring now to FIGS. 1, 2, and 3, an example of selections between zones and channels will now be illustrated. In FIG. 1, the radio 10 has button 22 designated as the channel down button and button 24 is designated as the channel up button when the radio is held in the vertical position. By rotating the radio 90° clockwise as shown in FIG. 2, the orientation detection means contained within the radio causes the controller to shift the functionality of buttons 22 and 24 such that button 22 now becomes the zone up button and button 24 becomes the zone down button. Since the icon on button 22 is an arrow that now points up and the icon on button 24 is an arrow that points down, this selection scheme is very intuitive. Once the user has selected the appropriate zone, the radio is then turned back to the vertical position as shown in FIG. 2 and the orientation detection means becomes deactivated or de-energized, causing the controller to return the functionality of buttons 22 and 24 to their original function. That is, button 22 is now the channel down button and button 24 is the channel up button. The user may now scroll up or down amongst the channels in the zone that was selected by tilting the radio as shown in FIG. 2.

The power of the instant invention is shown in FIG. 3, where the radio is turned 90° counterclockwise. Now, button 22, previously designated as the zone up button when the radio was rotated as shown in FIG. 2, is now designated by the controller to become the zone down button, whereas button 24 is now the zone up button. This change is made by using the orientation detector and controller to reprogram the functionality of buttons 22 and 24. This reprogramming causes the functionality of the buttons to remain intuitive to the user. That is, the button with the upward facing arrow is used to scroll upwards through the zones, and the button with the downward facing arrow is used to scroll downward through the zones. Depending upon the type of orientation detector used, a single detector may be able to detect multiple positions or the designer may wish to provide a plurality or orientation detectors, each of which detects a single orientation. In any event, the use of these detectors and the programming scheme that controls the operational mode of the controller allows the buttons 22 and 24 to continuously have a function that is intuitive to the user, thus making the operation of the radio more simplified and easier.

Figure 4:
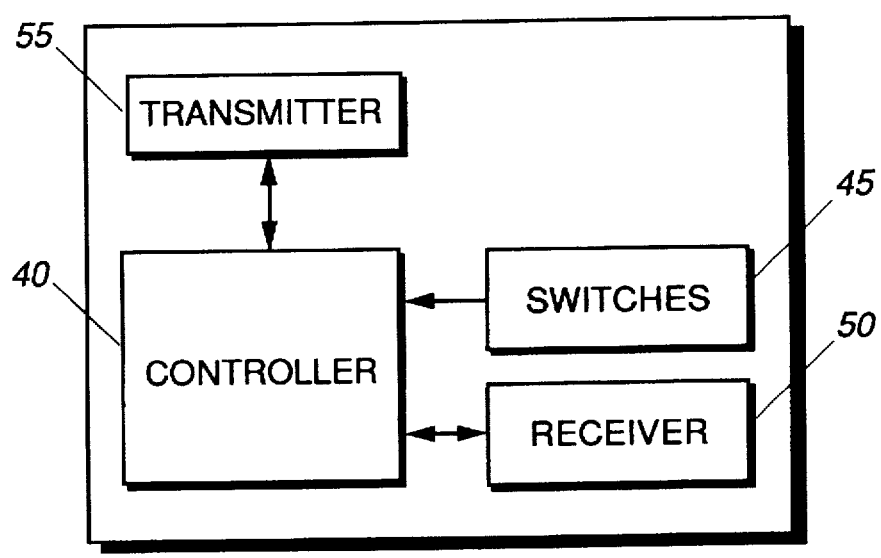
FIG. 4 is a schematic representation of the electronic modules in a two radio in accordance with the invention.
Figure 5:
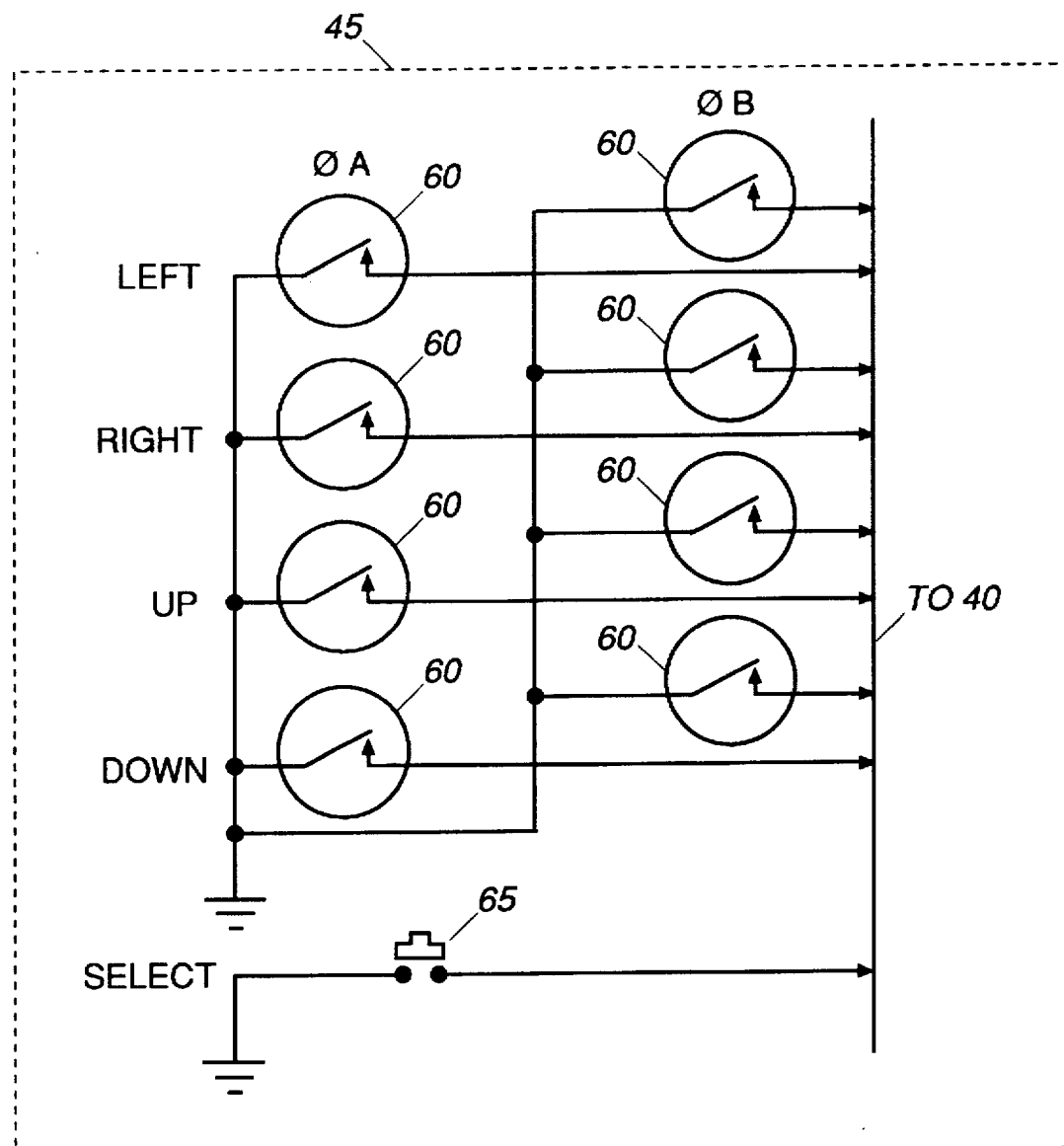
FIG. 5 is a schematic representation of the orientation detection means of FIG. 4 configured in a two radio in accordance with the invention.

FIG. 4 shows a schematic display of a radio with the orientation control parameter selection resident therein. The controller 40 is responsive to a series of switches 45. The controller 40 also controls a receiver 50 and a transmitter 55. Referring now to FIG. 5, a blow-up of the switches of FIG. 4, a plurality of orientation detectors 60 are connected to a bus that runs to the controller 40. A switch 65 may be used to provide operator selection, and to allow activation and deactivation of the orientation detectors to prevent inadvertent adjustment or mode change. The eight orientation detectors 60 are used such that two sensors may be used in each of four directions. In each direction, one sensor will trip at a first tilt position FA, and another will trip at a second tilt position FB. A sensor trip at the first position will adjust an operational parameter in the corresponding direction in single increments or at a slow rate, while the sensor trip in the second position will move at a faster rate.

Each of the orientation detectors 60 determines whether or not the device is tilted a certain amount around some axis. Other types of tilt sensors may be used, however, such as liquid-filled capacitance tilt sensors or optical incremental encoders containing a pendulum. These orientation detecting switches can detect the direction of the tilt and also the extent of the tilt. A select switch 65 is used to make a selection or to temporarily activate or deactivate the tilt detection. This switch can be used to inactive the orientation detector 60 so that the electronic device does not continue to cycle the controller by having the orientation detector 60 continually being activated and deactivated. For example, in normal operation, a user carrying a radio may end up tilting the radio through a number of degrees of tilt while walking, and the use of a switch 65 to disable or deactivate the orientation detectors will conserve battery power and eliminate extraneous signals going to and from the controller.

In summary, a method and apparatus has been presented that adds functionality to an electronic device without adding additional buttons or switches on the exterior housing of the device. In this way, existing switches can achieve greater functionality by placing the device in one of several orientations. Internal orientation detectors along one or more axes cause the radio to change zones, channels, etc., which then allow the user to select from a list of items within that particular zone or channel. Additionally, audio or visual feedback is provided to the user to indicate that the orientation detector has been activated and the feature selection has been enabled. The addition of such a scheme also provides intuitive functionality, the buttons having icons such as up and down arrows, thus making the radio much more user friendly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of switching an electronic device wherein a user first orients the device to a predetermined position in space and then actuates a switch, comprising the following steps in the order named:
   a) providing an electronic device having first and second operational modes, at least one of the modes having two or more sub-modes, the device further having an orientation detection means and having a switch responsive to the orientation detection means, said sub-modes being selectable by the switch;
   b) the user orienting the electronic device to the predetermined position in space so as to activate the orientation detection means;
   c) the activated orientation detection means shifting the electronic device from the first operational mode to the second operational mode; and
   d) the user actuating the switch to select one of said two or more sub-modes.

2. The method as described in claim 1, further comprising a step, after step (d), of the user orienting the electronic device to a position in space that is different from the position in step (b) so as to de-activate the orientation detection means, thereby shifting the electronic device from the second operational mode to the first operational mode.

3. The method as described in claim 1, further comprising a step, after step (d), of the user orienting the electronic device to a position in space that is different from the position in step (b) so as to de-activate the orientation detection means, the electronic device remaining in the second operational mode.

4. The method as described in claim 1, wherein both the first and second operational modes have a plurality of sub-modes.

5. The method as described in claim 1, wherein the orientation detection means comprises absolute angular sensors, mercury switches.

6. The method as described in claim 1, wherein step (b) further comprises providing an audible tone when the orientation detection means is activated.

7. The method as described in claim 1, wherein step (b) further comprises providing a visual indication on a display when the orientation detection means is activated.

8. A method of switching an electronic device wherein a user first orients the device to a predetermined position in space and then actuates a switch, comprising the following steps in the order named:
   a) providing an electronic device having a plurality of operational modes and having an orientation detection means;
   b) the user orienting the electronic device to the predetermined position in space so as to activate the orientation detection means; and
   c) the activated orientation detection means shifting the electronic device from one of the plurality of operational modes to another of the plurality of operational modes.

9. The method as described in claim 8, wherein the electronic device further comprises a switch.

10. The method as described in claim 9, further comprising a step (d), after step (c), of the user actuating the switch in order to retain the electronic device in said another of the plurality of operational modes.

11. The method as described in claim 9, wherein the electronic device further comprises a second orientation detection means.

12. The method as described in claim 11, further comprising a step (d), after step (c), of the user orienting the electronic device to a position in space different from said predetermined position in step (b), so as to activate the second orientation detection means.

13. The method as described in claim 12, further comprising a step (e), after step (d), of the activated second orientation detection means shifting the electronic device to another of the plurality of operational modes.

14. The method as described in claim 8, further comprising a step (d), after step (c), of the user orienting the electronic device to a position in space that is different from the position in step (b) so as to de-activate the orientation detection means, thereby returning the electronic device to the operational mode prior to step (c).

15. The method as described in claim 8, further comprising a step (d), after step (c), of the user orienting the electronic device to a position in space that is different from the position in step (b) so as to de-activate the orientation detection means, the electronic device remaining shifted in said another of the plurality of operational modes.

16. The method as described in claim 8, wherein the plurality of operational modes each have a plurality of sub-modes.

17. The method as described in claim 8, wherein the orientation detection means comprises absolute angular sensors or mercury switches.

18. A radio having an orientation controlled parameter selection means, comprising:

a receiver coupled to a controller;

an orientation detection means and a switch responsive to the orientation detection means;

a controller having first and second modes, at least one of the modes having two or more sub-modes, said sub-modes being selectable by the switch; and the controller responsive to the orientation detection means and to the switch, the controller shifting from the first mode to the second mode when the orientation detection means is activated by a user tilting the radio to a predetermined position, and the controller shifting to another sub-mode when the user actuates the switch.

19. The radio as described in claim 18, further comprising a sound producing means that provides an audible tone when the controller shifts from the first mode to the second mode.

20. The radio as described in claim 18, further comprising a display that provides a visual indication when the controller shifts from the first mode to the second mode.

21. A two-way radio having an orientation controlled parameter selection means wherein a user orients the radio to a predetermined position in space to select an operational parameter, comprising:

a receiver and a transmitter each coupled to a controller, the controller having a plurality of operational modes;

one or more orientation detectors coupled to the controller, the controller being responsive to the orientation detectors; and the controller changing from one operational mode to another operational mode when one or more of the orientation detectors is activated by the user orienting the radio to the predetermined position in space.

22. The two-way radio as described in claim 21, further comprising a sound producing means that provides an audible tone when the controller changes from one operational mode to another operational mode.

23. The two-way radio as described in claim 21, further comprising a display that provides a visual indication when the controller changes from one operational mode to another operational mode.

* * * * *